United States Patent [19]

Koitabashi

[11] Patent Number: 4,804,075

[45] Date of Patent: Feb. 14, 1989

[54] ELECTROMAGNETIC CLUTCH

[75] Inventor: Takatoshi Koitabashi, Annaka, Japan

[73] Assignee: Sanden Corporation, Isesaki, Japan

[21] Appl. No.: 67,880

[22] Filed: Jun. 30, 1987

[30] Foreign Application Priority Data

Jul. 10, 1986 [JP] Japan .................... 61-160907

[51] Int. Cl.⁴ ............ F16D 27/10; F16D 3/12; F16D 3/68

[52] U.S. Cl. ................ 192/84 C; 192/106.1; 464/76; 464/85

[58] Field of Search .............. 192/84 C, 106.1, 30 V; 464/73, 76, 85

[56] References Cited

U.S. PATENT DOCUMENTS

| | | | |
|---|---|---|---|
| 3,205,989 | 9/1965 | Mantey | 192/84 C |
| 3,314,512 | 4/1967 | Kerestury | 464/76 X |
| 3,396,556 | 8/1968 | Giegerich | |
| 3,752,279 | 8/1973 | Briar | 192/84 C |
| 4,445,606 | 5/1984 | VanLaningham | 192/106.1 |
| 4,493,407 | 1/1985 | Newton | 192/84 C |

FOREIGN PATENT DOCUMENTS

| | | | |
|---|---|---|---|
| 509540 | 4/1957 | Italy | 464/76 |
| 36618 | 5/1955 | Poland | 464/76 |
| 1589088 | 5/1981 | United Kingdom | |

Primary Examiner—Leslie A. Braun
Assistant Examiner—Richard M. Lorence
Attorney, Agent, or Firm—Banner, Birch, McKie & Beckett

[57] ABSTRACT

An electromagnetic clutch for an automotive air conditioning system is disclosed. The electromagnetic clutch includes a rotor, an electromagnetic coil, and an armature plate. A hub is secured to a drive shaft and has a radially extending flange portion which is provided with a plurality of pairs of first projecting portions. A damper plate is disposed forwardly of the armature plate so as to be connected with the armature plate through a plurality of leaf springs and is provided with a plurality of second projecting portions and longitudinal holes on the axial end surface thereof. Each pair of the first projecting portions can be disposed within each pair of the second projecting portions with a gap therebetween that may accommodate one of a plurality of elastic members. A stopper plate is disposed on the axial end surface of the damper plate and may be radially moved within the range of the longitudinal holes which are provided therein. Therefore, torsional resonance, shock and vibration are eased by the principally compressive deformation of the elastic member which is enclosed within the space between the first and second projecting portions.

4 Claims, 2 Drawing Sheets

ELECTROMAGNETIC CLUTCH

TECHNICAL FIELD

This invention relates to an electromagnetic clutch, such as one used in controlling the transmission of power from an automotive engine to a refrigerant compressor for an automotive air conditioning system and more particularly, to an improved engaging structure between an armature and a hub for transferring the rotation of a pulley to the drive shaft of a driven device.

BACKGROUND OF THE INVENTION

Various types of electromagnetic clutches are well known in the prior art and each type of electromagnetic clutch is selected in accordance with the type of driven device.

One type of electromagnetic clutch suitable for use with the compressor of an automobile air conditioner is disclosed in U.S. Pat. No. 4,445,606. That patent discloses an electromagnetic clutch comprising a rotor rotatably mounted on the stationary housing of a driven device through a bearing, a hub fixed on the axial end surface of the drive shaft and an armature which is disposed to face one end surface of the rotor with an axial gap therebetween.

A bumper plate is disposed on the outer peripheral portion of the hub to couple it with the hub by means of a toothed structure. An elastic spider is placed between the hub and bumper plate to allow limited rotation of the hub. The bumper faces the armature plate with a gap therebetween, and engages the armature plate through a plurality of leaf springs. Therefore, torsional shock and vibration which is caused by the initial attachment of the armature plate to the pole of the rotor and which acts against the drive shaft, is absorbed.

In this type of electromagnetic clutch, the elastic spider is made of an elastic material, for example, rubber, and attached on the toothed structure of the hub and bumper plate by a vulcanizing process. However, the coupling structure between the bumper plate and the hub is very complicated. As a result, the assembly of the clutch, particularly, the vulcanizing process, is quite complicated. Thus, the cost of the clutch is increased.

SUMMARY OF THE INVENTION

It is a primary object of this invention to provide an electromagnetic clutch which has a mechanism, of a simple construction, for easing the tortional resonance, shock, and vibration transmitted to a drive shaft.

It is another object of this invention to provide an electromagnetic clutch which has parts that are easily manufactured.

It is still another object of this invention to provide an electromagnetic clutch which may be easily assembled by a simple process.

It is still another object of this invention to provide an electromagnetic clutch which is manufactured at a low cost.

An electromagnetic clutch, according to the present invention, includes a first rotatable member having an axial end plate of magnetic material and a second rotatable member which is to be connnected to a driven member. An annular armature plate made of a magnetic material is disposed to face the first rotatable member with a gap therebetween so as to be capable of limited axial movement. An electromagnetic means is associated with the axial end plate for attracting the armature plate thereto. A hub flange is located on the outer surface of the second rotatable member and is provided with a plurality of pairs of first projecting portions on the axial end surface. A damper plate is disposed forwardly of the armature plate so as to be connected with the armature plate through a plurality of leaf springs and is provided with a plurality of pairs of second projecting portions and longitudinal holes on the axial end surface thereof so that each pair of the first projecting portions can be put into each pair of the second projecting portions through one of a plurality of elastic members. A stopper plate is disposed on the axial end surface of the damper plate so as to be radially movable within the range of the longitudinal holes. Therefore, torsional resonance, shock and vibration are eased by principally compressive deformation of the elastic member which is enclosed within the space between the first and second projecting portions.

Further objects, features and aspects of this invention will be understood from the following detailed description of the preferred embodiment of this invention and by referring to the annexed drawings.

DETAILED DESCRIPTION OF THE PREFERRED EMBODIMENTS

Figure 1:
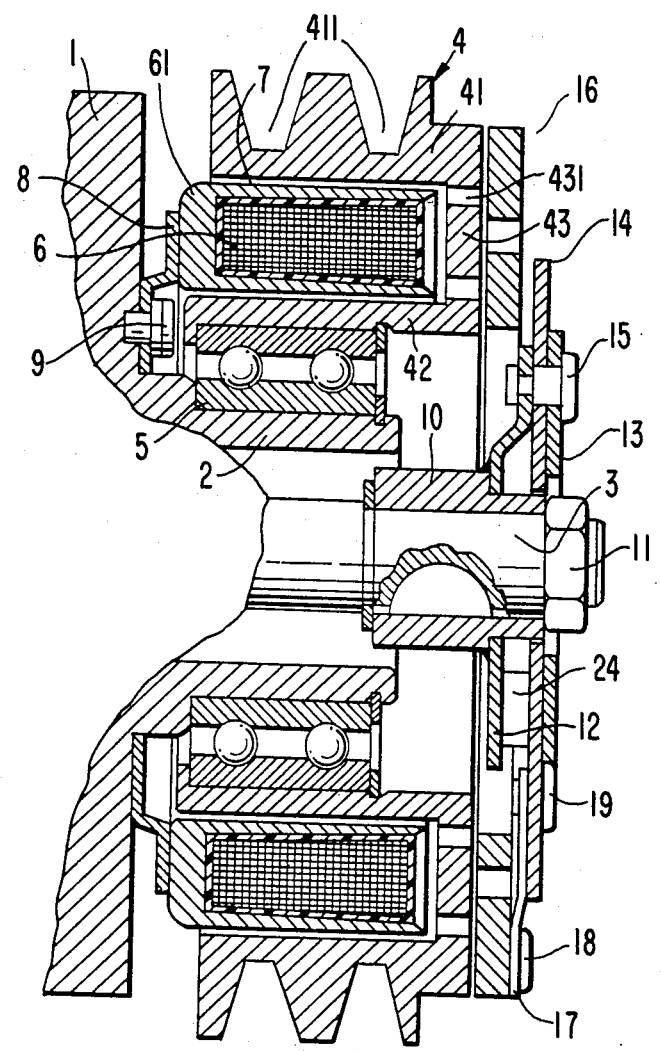
FIG. 1 is a cross-sectional view of an electromagnetic clutch in accordance with one embodiment of this invention.

Referring to FIG. 1, there is shown an electromagnetic clutch which, according to one embodiment of this invention, is assembled to a refrigerant compressor for an automotive air conditioning system. Compressor housing 1 is provided with tubular extension 2 axially projecting therefrom for surrounding an extension of drive shaft 3 of the compressor. Drive shaft 3 is rotatably supported in compressor housing 1 by a bearing (not shown).

Rotor 4 is rotatably supported on tubular extension 2 through bearing 5 which is mounted on the outer peripheral surface of tubular extension 2. Rotor 4 is made of magnetic material, such as steel, and comprises outer cylindrical portion 41, inner cylindrical portion 42 and axial end plate portion 43 which connects outer and inner portioNs 41, 42 at an axial forward end. Outer cylindrical portion 41 has V-shaped portioNs formed therein for receiving a belt which is coupled to the output shaft of the automotive engine (not shown).

Axial end plate portion 43 has one or more concentric slits 431 which are disposed on one or more concentric circles. These slits 431 define a plurality of annular or arcuate magnetic pieces with the surface of the poles being on the axial end surface of axial end plate portion 43.

Electromagnetic coil 6 is disposed in annular cavity 7 of rotor 4. Coil 6 is contained within annular magnetic housing 61 which has a U-shaped cross-section. Housing 61 is fixed to supporting plate 8, which is secured to the axial end surface of compressor housing 1 by a plurality of rivets 9. Coil housing 61 is maintained within cavity 7 of rotor 4 without contact therewith, with a small gap between for permitting rotation of rotor 4.

Figure 2:
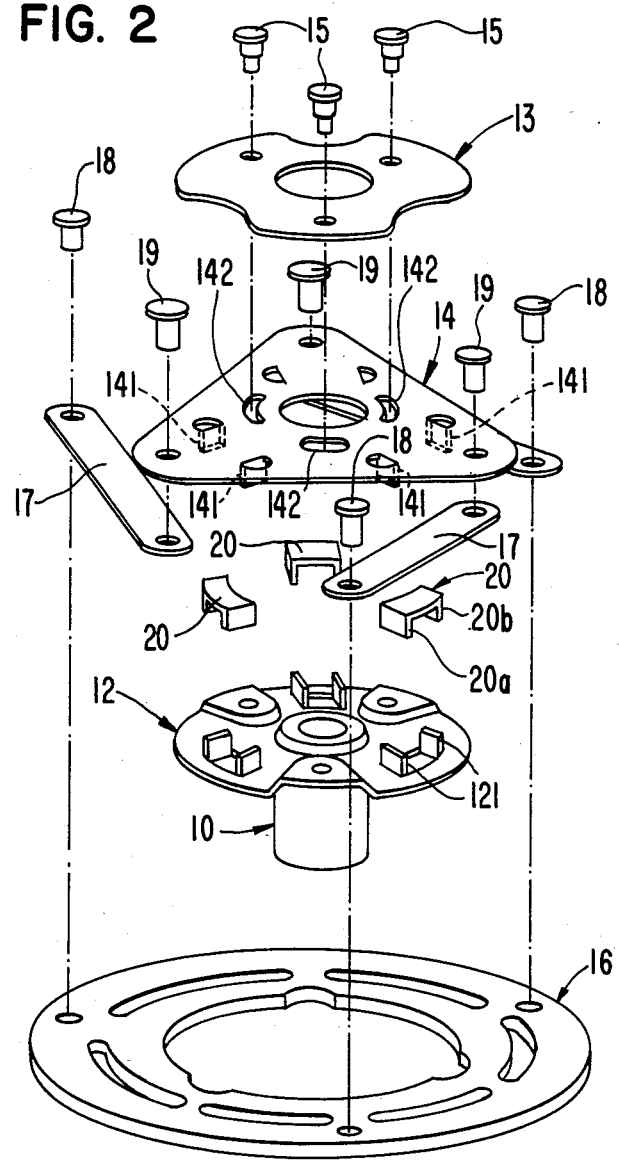
FIG. 2 is a partial perspective view of the elecromagnetic clutch of FIG. 1.
Figure 3:
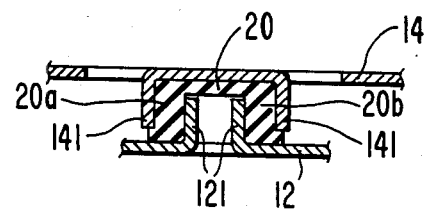
FIG. 3 is a cross-sectional view of the vibration absorber portion which is used in the electromagnetic clutch of FIG. 1.

As best seen in FIGS. 2 and 3, hub 10 is disposed on an outer terminal end of drive shaft 3 and is secured by nut 11. Hub 10 is provided with radial flange 12 which extends radially outwardly therefrom. Radial flange 12 is fixed to hub 10, for example, by welding it thereto. Also, a stopper plate 13 and a damper plate 14 are attached on flange 12 by a plurality of rivets 15. Damper plate 14 is joined to armature plate 16 by a plurality of leaf springs 17, i.e., one end portion of leaf spring 17 is secured to armature plate 16 by rivets 18 and the other end is secured to damper plate 14 by rivets 19, so that armature plate 16 faces rotor 4 with a small axial gap therebetween.

Radial flange 12 is provided with a plurality of projecting portions 121. Projecting portions 121 are formed by cutting and bending a part of radial flange 12 and face each other in the circular direction.

Damper plate 14 is provided with a plurality of projecting portions 141 which are formed on the axial end surface thereof to project axially and face the plurality of projecting portions 121 with a gap 24 therebetween. The gap between projecting portions of the radial flange and the damper plate accommodates elastic member 20. The number of projecting portions 141 is preferably the same as the number of projecting portions 121. Projecting portions 141 are disposed such that they are positioned facing projecting portions 121 and are formed by cutting and bending a part of damper plate 14.

The distance between a pair of projecting portions 141 is greater than the distance between a pair of projecting portions 121 so that elastic members 20 including vibration absorber portions 20a, 20b may be placed therebetween. Elastic member 20 is made of an elastic material, such as rubber.

Damper plate 14 is provided with a plurality of substantially longitudinal holes 142 which may be penetrated by rivets 15. The size of the longitudinal holes, with respect to the rivets, is such that the longitudinal holes are larger than the diameter of the rivets to allow the damper plate to move to a limited degree as dictated by the size of the holes and diameter of the rivets. Accordingly, damper plate 14 may be rotated within the angular range allowed by longitudinal holes 142 with respect to hub flange 12.

The operation of the above-mentioned electromagnetic clutch, when disposed on a refrigerant compressor, will now be described. When coil 6 is energized, armature plate 16 is attracted to rotor 4 by the magnetic force generated by coil 6. Accordingly, the rotational force of rotor 4 is transmitted to drive shaft 3 through armature plate 16 and hub 10, then drive shaft 3 rotates together with armature plate 16. Thus, the refrigerant compressor commences the compressing operation.

Simultaneously, compressed refrigerant gas in the refrigerant compressor produces a reaction force in the direction opposite to the rotational force of drive shaft 3. In other words, the rotational force in the opposite direction of the rotational direction of damper plate 14 is transmitted to hub 10. However, since damper plate 14 is rotatably fixed to hub 10 through elastic member 20 with vibration absorber portions 20a, 20b, even though hub 10 rotates in the direction opposite to the rotational direction of damper plate 14, drive shaft 3 is prevented from receiving torsional resonance by the compression and transformation of the vibration absorber portions 20a, 20b of elastic member 20.

This invention has been described in detail in connection with the preferred embodiment, but is for example only and this invention is not restricted thereto. It wiill be easily understood by those skilled in the art that other variations and modifications can be easily made within the scope of this invention.

What is claimed is:

1. In an electromagnetic clutch including a first rotatable member having an axial end plate of magnetic material, a second rotatable member connected to a drive shaft, an annular armature plate of magnetic material disposed to face said axial end plate of said first rotatable member with an axial gap therebetween, said annular armature plate being capable of limited axial movement, and electromagnetic means associated with said axial end plate for attracting said armature plate to said axial end plate of said first rotatable member, the improvement comprising a radial flange formed on said second rotatable member and provided with a plurality of pairs of first projecting portions on an axial end surface thereof, a damper plate disposed adjacent said armature plate and connected with said armature plate through a plurality of leaf springs, said damper plate having a plurality of pairs of second projecting portions each pair of which face and interfit a pair of said first projecting portions on said radial flange and an elastic member positioned between each pair of interfitting pairs of said first and second projecting portions to absorb torsional and vibrational forces upon activation of said electromagnetic clutch.

2. The electromagnetic clutch of claim 1 further comprising flange attaching means for attaching said radial flange to said damper plate in a manner that permits said damper plate to undergo limited rotational movement relative to said radial flange.

3. The electromagnetic clutch of claim 1 wherein each of said pairs of first projecting portions fit within one of said pair of second projecting portions, one of said elastic members fitting between and interconnecting each pair of said first and second projecting portions.

4. In an electromagnetic clutch including a first rotatable. member having an axial end plate of magnetic material, a second rotatable member connected to a drive shaft, an annular armature plate of magnetic material disposed to face said axial end plate of said first rotatable member with an axial gap therebetween, said annular armature plate being capable of limited axial movement, and electromagnetic means associated with said axial end plate for attracting said armature plate to said axial end plate of said first rotatable member, the improvement comprising a radial flange formed on said second rotatable member and provided with a plurality of pairs of first projecting portions on an axial end surface thereof, a damper plate disposed adjacent said armature plate and connected with said armature plate through a plurality of leaf springs, said damper plate having a plurality of pairs of second projecting portions each pair of which face and interfit a pair of said first projecting portions on said radial flange and an elastic member positioned between each pair of interfitting pairs of said first and second projecting portions to absorb torsional and vibrational forces upon activation of said electromagnetic clutch, wherein each of said pairs of first projecting portions fit within one of said pairs of second projecting portions such that the first pair of projecting portions and second pair of projecting portions cooperate with each other to enable an elastic member to fit therebetween and interconnect each pair of said first and second projecting portions.

* * * * *